US010436970B2

(12) United States Patent
Durkee

(10) Patent No.: US 10,436,970 B2
(45) Date of Patent: Oct. 8, 2019

(54) SHAPED OPTICAL WAVEGUIDE BODIES

(71) Applicant: Cree, Inc., Durham, NC (US)

(72) Inventor: John W. Durkee, Raleigh, NC (US)

(73) Assignee: Ideal Industries Lighting LLC, Sycamore, IL (US)

( * ) Notice: Subject to any disclaimer, the term of this patent is extended or adjusted under 35 U.S.C. 154(b) by 0 days.

(21) Appl. No.: 13/841,622

(22) Filed: Mar. 15, 2013

(65) Prior Publication Data

US 2014/0268875 A1  Sep. 18, 2014

(51) Int. Cl.
*F21V 8/00* (2006.01)
(52) U.S. Cl.
CPC ......... *G02B 6/0046* (2013.01); *G02B 6/0038* (2013.01); *G02B 6/0045* (2013.01); *G02B 6/0063* (2013.01); *G02B 6/0018* (2013.01); *G02B 6/0048* (2013.01)
(58) Field of Classification Search
CPC ........ G02B 6/0008; G02B 6/0005–001; G02B 6/0028; G02B 6/0045–0048; G02B 6/0038; G02B 6/0063
USPC .................................. 362/607–629, 555, 551
See application file for complete search history.

(56) References Cited

U.S. PATENT DOCUMENTS

| | | | |
|---|---|---|---|
| 2,992,587 A | 4/1958 | Hicks, Jr. et al. | |
| 3,372,740 A | 3/1968 | Kastovich et al. | |
| 3,532,871 A | 10/1970 | Shipman | |
| 4,146,297 A | 3/1979 | Alferness et al. | |
| 4,441,787 A | 4/1984 | Lichtenberger | |
| 4,714,983 A | 12/1987 | Lang | |
| 4,914,553 A * | 4/1990 | Hamada ............... | G02B 6/0048 362/614 |
| 4,954,930 A | 9/1990 | Maegawa et al. | |
| 4,977,486 A | 12/1990 | Gotoh | |
| 5,005,108 A | 4/1991 | Pristash | |
| 5,009,483 A | 4/1991 | Rockwell, III | |
| 5,026,161 A | 6/1991 | Werner | |
| 5,040,098 A | 8/1991 | Tanaka et al. | |
| 5,047,761 A | 9/1991 | Sell | |
| 5,061,404 A | 10/1991 | Wu et al. | |
| 5,097,258 A | 3/1992 | Iwaki | |
| 5,113,177 A | 5/1992 | Cohen | |

(Continued)

FOREIGN PATENT DOCUMENTS

| | | |
|---|---|---|
| DE | 20014114 | 12/2000 |
| DE | 20107425 | 7/2001 |

(Continued)

OTHER PUBLICATIONS

International Search Report and Written Opinion dated Jul. 28, 2014, for International Application No. PCT/US2014/28938, Applicant, Cree, Inc. (19 pages).

(Continued)

*Primary Examiner* — Mariceli Santiago
(74) *Attorney, Agent, or Firm* — Myers Bigel, P.A.

(57) ABSTRACT

Disclosed is an optical waveguide body having a first surface that includes one or more tapered portions displaced between an input surface and an end surface or edge of the waveguide body. A second surface displaced from and opposite the first surface may also include one or more tapered portions between the input surface wherein the furthest tapered portions of the first and second surface forms and end surface or edge.

9 Claims, 12 Drawing Sheets

(56) References Cited

U.S. PATENT DOCUMENTS

| | | |
|---|---|---|
| 5,113,472 A | 5/1992 | Gualtieri et al. |
| 5,165,772 A * | 11/1992 | Wu .................... B60Q 1/302 |
| | | 362/309 |
| 5,171,080 A | 12/1992 | Bathurst |
| 5,175,787 A | 12/1992 | Gualtieri et al. |
| 5,186,865 A | 2/1993 | Wu et al. |
| 5,245,689 A | 9/1993 | Gualtieri |
| 5,253,317 A | 10/1993 | Allen et al. |
| 5,295,019 A | 3/1994 | Rapoport |
| 5,309,544 A | 5/1994 | Saxe |
| 5,359,687 A | 10/1994 | McFarland |
| 5,359,691 A | 10/1994 | Tai et al. |
| 5,396,350 A | 3/1995 | Beeson et al. |
| 5,398,179 A | 3/1995 | Pacheco |
| 5,400,224 A | 3/1995 | DuNah et al. |
| 5,428,468 A | 6/1995 | Zimmerman et al. |
| 5,461,547 A | 10/1995 | Ciupke et al. |
| 5,462,700 A | 10/1995 | Beeson et al. |
| 5,481,385 A | 1/1996 | Zimmerman et al. |
| 5,506,924 A | 4/1996 | Inoue |
| 5,521,725 A | 5/1996 | Beeson et al. |
| 5,521,726 A | 5/1996 | Zimmerman et al. |
| 5,528,720 A | 6/1996 | Winston et al. |
| 5,537,304 A | 7/1996 | Klaus |
| 5,541,039 A | 7/1996 | McFarland et al. |
| 5,548,670 A | 8/1996 | Koike |
| 5,553,092 A | 9/1996 | Bruce et al. |
| 5,555,109 A | 9/1996 | Zimmerman et al. |
| 5,555,160 A | 9/1996 | Tawara et al. |
| 5,555,329 A | 9/1996 | Kuper et al. |
| 5,572,411 A | 11/1996 | Watai et al. |
| 5,577,492 A | 11/1996 | Parkyn, Jr. et al. |
| 5,584,556 A | 12/1996 | Yokoyama et al. |
| 5,598,280 A | 1/1997 | Nishio et al. |
| 5,598,281 A | 1/1997 | Zimmerman et al. |
| 5,613,751 A | 3/1997 | Parker et al. |
| 5,613,770 A | 3/1997 | Chin, Jr. et al. |
| 5,657,408 A | 8/1997 | Ferm et al. |
| 5,658,066 A | 8/1997 | Hirsch |
| 5,659,410 A | 8/1997 | Koike et al. |
| 5,676,453 A | 10/1997 | Parkyn, Jr. et al. |
| 5,676,457 A | 10/1997 | Simon |
| 5,677,702 A | 10/1997 | Inoue et al. |
| 5,685,634 A | 11/1997 | Mulligan |
| 5,696,865 A | 12/1997 | Beeson et al. |
| 5,702,176 A | 12/1997 | Engle |
| 5,718,497 A | 2/1998 | Yokoyama et al. |
| 5,719,649 A * | 2/1998 | Shono .................... G02B 6/0036 |
| | | 349/65 |
| 5,727,107 A | 3/1998 | Umemoto et al. |
| 5,735,590 A | 4/1998 | Kashima et al. |
| 5,739,931 A | 4/1998 | Zimmerman et al. |
| 5,748,828 A | 5/1998 | Steiner et al. |
| 5,761,355 A | 6/1998 | Kuper et al. |
| 5,769,522 A | 6/1998 | Kaneko et al. |
| 5,771,039 A | 6/1998 | Ditzik |
| 5,777,857 A | 7/1998 | Degelmann |
| 5,806,955 A | 9/1998 | Parkyn, Jr. et al. |
| 5,812,714 A | 9/1998 | Hulse |
| 5,818,555 A | 10/1998 | Yokoyama et al. |
| 5,839,823 A | 11/1998 | Hou et al. |
| 5,850,498 A | 12/1998 | Shacklette et al. |
| 5,854,872 A | 12/1998 | Tai |
| 5,863,113 A | 1/1999 | Oe et al. |
| 5,872,883 A | 2/1999 | Ohba et al. |
| 5,897,201 A | 4/1999 | Simon |
| 5,914,759 A | 6/1999 | Higuchi et al. |
| 5,914,760 A | 6/1999 | Daiku |
| 5,949,933 A | 9/1999 | Steiner et al. |
| 5,961,198 A | 10/1999 | Hira et al. |
| 5,967,637 A | 10/1999 | Ishikawa et al. |
| 5,974,214 A | 10/1999 | Shacklette et al. |
| 5,997,148 A | 12/1999 | Ohkawa |
| 5,999,281 A | 12/1999 | Abbott et al. |
| 5,999,685 A | 12/1999 | Goto et al. |
| 6,002,829 A | 12/1999 | Winston et al. |
| 6,007,209 A | 12/1999 | Pelka |
| 6,043,951 A | 3/2000 | Lee |
| 6,044,196 A | 3/2000 | Winston et al. |
| 6,079,838 A | 6/2000 | Parker et al. |
| 6,097,549 A | 8/2000 | Jenkins et al. |
| 6,134,092 A | 10/2000 | Pelka et al. |
| 6,139,176 A | 10/2000 | Hulse et al. |
| 6,151,089 A | 11/2000 | Yang et al. |
| 6,155,692 A | 12/2000 | Ohkawa |
| 6,155,693 A | 12/2000 | Spiegel et al. |
| 6,161,939 A | 12/2000 | Bansbach |
| 6,164,790 A | 12/2000 | Lee |
| 6,164,791 A | 12/2000 | Gwo-Juh et al. |
| 6,167,182 A | 12/2000 | Shinohara et al. |
| 6,185,357 B1 | 2/2001 | Zou et al. |
| 6,196,692 B1 * | 3/2001 | Umemoto .................... G02B 6/005 |
| | | 349/63 |
| 6,206,535 B1 | 3/2001 | Hattori et al. |
| 6,231,200 B1 | 5/2001 | Shinohara et al. |
| 6,232,592 B1 | 5/2001 | Sugiyama |
| 6,241,363 B1 | 6/2001 | Lee |
| 6,257,737 B1 | 7/2001 | Marshall et al. |
| 6,259,854 B1 | 7/2001 | Shinji et al. |
| D446,333 S | 8/2001 | Fröis |
| 6,304,693 B1 | 10/2001 | Buelow, II et al. |
| 6,305,813 B1 * | 10/2001 | Lekson .................... B60Q 1/302 |
| | | 362/625 |
| 6,310,704 B1 | 10/2001 | Dogan et al. |
| 6,379,016 B1 | 4/2002 | Boyd et al. |
| 6,379,017 B2 | 4/2002 | Nakabayashi et al. |
| 6,400,086 B1 | 6/2002 | Huter |
| 6,421,103 B2 | 7/2002 | Yamaguchi |
| 6,443,594 B1 | 9/2002 | Marshall et al. |
| 6,461,007 B1 | 10/2002 | Akaoka |
| 6,473,554 B1 | 10/2002 | Pelka et al. |
| 6,480,307 B1 | 11/2002 | Yang et al. |
| 6,485,157 B2 | 11/2002 | Ohkawa |
| 6,508,563 B2 | 1/2003 | Parker et al. |
| 6,523,986 B1 | 2/2003 | Hoffmann |
| 6,536,921 B1 | 3/2003 | Simon |
| 6,541,720 B2 | 4/2003 | Gerald et al. |
| 6,554,451 B1 | 4/2003 | Keuper |
| 6,568,819 B1 | 5/2003 | Yamazaki et al. |
| 6,582,103 B1 | 6/2003 | Popovich et al. |
| 6,585,356 B1 | 7/2003 | Ohkawa |
| 6,598,998 B2 | 7/2003 | West et al. |
| 6,612,723 B2 | 9/2003 | Futhey et al. |
| 6,616,290 B2 | 9/2003 | Ohkawa |
| 6,629,764 B1 | 10/2003 | Uehara |
| 6,633,722 B1 | 10/2003 | Kohara et al. |
| 6,634,772 B2 | 10/2003 | Yaphe et al. |
| 6,647,199 B1 | 11/2003 | Pelka et al. |
| 6,652,109 B1 | 11/2003 | Nakamura |
| 6,637,924 B2 | 12/2003 | Pelka et al. |
| 6,659,628 B2 | 12/2003 | Gomez Del Campo |
| 6,671,452 B2 | 12/2003 | Winston et al. |
| 6,676,284 B1 | 1/2004 | Wynne Willson |
| 6,678,021 B2 | 1/2004 | Ohkawa |
| 6,679,621 B2 | 1/2004 | West et al. |
| 6,712,481 B2 | 3/2004 | Parker et al. |
| 6,724,529 B2 | 4/2004 | Sinkoff |
| 6,724,543 B1 | 4/2004 | Chinniah et al. |
| 6,727,965 B1 | 4/2004 | Kubota |
| 6,752,505 B2 | 6/2004 | Parker et al. |
| 6,755,546 B2 | 6/2004 | Ohkawa |
| 6,755,556 B2 | 6/2004 | Gasquet et al. |
| 6,758,582 B1 | 7/2004 | Hsiao et al. |
| 6,775,460 B2 | 8/2004 | Steiner et al. |
| 6,796,676 B2 | 9/2004 | Severtson et al. |
| 6,802,626 B2 | 10/2004 | Belfer et al. |
| 6,802,628 B2 | 10/2004 | Kuo |
| 6,840,656 B2 | 1/2005 | Kuo |
| 6,845,212 B2 | 1/2005 | Gardiner et al. |
| 6,854,857 B2 * | 2/2005 | Hara et al. .................... 362/613 |
| 6,876,408 B2 | 4/2005 | Yamaguchi |
| 6,894,740 B2 | 5/2005 | Ohkawa |
| 6,896,381 B2 | 5/2005 | Benitez et al. |
| 6,924,943 B2 | 8/2005 | Minano et al. |

(56) References Cited

U.S. PATENT DOCUMENTS

| | | |
|---|---|---|
| D511,221 S | 11/2005 | Zucker |
| 6,974,241 B2 | 12/2005 | Hara et al. |
| 6,992,335 B2 | 1/2006 | Ohkawa |
| 7,025,482 B2 | 4/2006 | Yamashita et al. |
| 7,046,318 B2 | 5/2006 | Yu et al. |
| 7,046,905 B1 | 5/2006 | Gardiner et al. |
| 7,063,430 B2 | 6/2006 | Greiner |
| 7,072,096 B2 | 7/2006 | Holman et al. |
| 7,083,313 B2 | 8/2006 | Smith |
| 7,085,460 B2 | 8/2006 | Leu et al. |
| 7,090,370 B2 | 8/2006 | Clark et al. |
| 7,090,389 B2 | 8/2006 | Parker et al. |
| 7,097,341 B2 | 8/2006 | Tsai |
| 7,106,528 B2 | 9/2006 | Ohmori et al. |
| 7,111,969 B2 | 9/2006 | Bottesch et al. |
| 7,118,253 B1 | 10/2006 | Simon |
| 7,131,764 B2 | 11/2006 | Hsu et al. |
| 7,152,985 B2 | 12/2006 | Benitez et al. |
| 7,160,010 B1 | 1/2007 | Chinniah et al. |
| 7,160,015 B2 | 1/2007 | Parker |
| 7,168,841 B2 | 1/2007 | Hsieh et al. |
| 7,175,330 B1 | 2/2007 | Chen |
| 7,178,941 B2 | 2/2007 | Roberge et al. |
| 7,182,480 B2 | 2/2007 | Kan |
| 7,192,174 B2 | 3/2007 | Myoung |
| 7,195,374 B2 | 3/2007 | Saccomanno et al. |
| 7,204,634 B2 | 4/2007 | Chen et al. |
| 7,209,628 B2 | 4/2007 | Winston |
| 7,222,995 B1 | 5/2007 | Bayat et al. |
| 7,223,004 B2 | 5/2007 | Chen et al. |
| 7,246,931 B2 | 7/2007 | Hsieh et al. |
| 7,258,467 B2 | 8/2007 | Saccomanno et al. |
| 7,265,800 B2 | 9/2007 | Jagt et al. |
| 7,273,299 B2 | 9/2007 | Parkyn et al. |
| 7,292,767 B2 | 11/2007 | Cheng |
| D563,036 S | 2/2008 | Miryairi et al. |
| D565,778 S | 4/2008 | Pedersen |
| 7,364,342 B2 | 4/2008 | Parker et al. |
| D568,529 S | 5/2008 | Colleran, Jr. et al. |
| 7,393,124 B1 | 7/2008 | Williams |
| 7,393,132 B2 * | 7/2008 | Chen ............... G02B 6/0025 349/65 |
| 7,399,108 B2 | 7/2008 | Ayabe et al. |
| 7,400,809 B2 | 7/2008 | Erben et al. |
| 7,404,660 B2 | 7/2008 | Parker |
| D575,898 S | 8/2008 | Tran et al. |
| 7,422,357 B1 | 9/2008 | Chang |
| 7,458,714 B2 | 12/2008 | Chang |
| 7,465,074 B2 | 12/2008 | Blumel |
| 7,486,854 B2 | 2/2009 | Van Ostrand et al. |
| 7,488,093 B1 | 2/2009 | Huang et al. |
| 7,513,672 B2 | 4/2009 | Parker |
| 7,520,650 B2 | 4/2009 | Smith |
| 7,534,013 B1 | 5/2009 | Simon |
| 7,559,672 B1 | 7/2009 | Parkyn et al. |
| 7,566,148 B2 | 7/2009 | Noh et al. |
| 7,566,159 B2 | 7/2009 | Oon et al. |
| 7,581,854 B2 | 9/2009 | Ford |
| D604,002 S | 11/2009 | Santoro |
| 7,614,764 B2 | 11/2009 | Williams et al. |
| 7,626,655 B2 | 12/2009 | Yamazaki et al. |
| 7,628,508 B2 | 12/2009 | Kita et al. |
| 7,635,205 B2 | 12/2009 | Yu et al. |
| 7,639,918 B2 | 12/2009 | Sayers et al. |
| 7,641,363 B1 | 1/2010 | Chang et al. |
| 7,648,256 B2 | 1/2010 | Shiratsuchi et al. |
| 7,665,865 B1 | 2/2010 | Hulse et al. |
| 7,674,018 B2 | 3/2010 | Holder et al. |
| 7,703,950 B2 | 4/2010 | Ewert et al. |
| 7,703,967 B2 | 4/2010 | Parker |
| 7,710,663 B2 | 5/2010 | Barnes et al. |
| 7,722,224 B1 | 5/2010 | Coleman et al. |
| 7,722,241 B2 | 5/2010 | Chang |
| 7,724,321 B2 | 5/2010 | Hsieh et al. |
| D617,489 S | 6/2010 | Santoro |
| D618,842 S | 6/2010 | Ngai et al. |
| 7,736,019 B2 | 6/2010 | Shimada et al. |
| 7,736,045 B2 | 6/2010 | Yamashita et al. |
| 7,750,982 B2 | 7/2010 | Nelson et al. |
| 7,753,551 B2 | 7/2010 | Yaphe et al. |
| 7,758,227 B1 | 7/2010 | Coleman |
| 7,760,290 B2 | 7/2010 | Kang et al. |
| 7,762,705 B2 | 7/2010 | Sakai et al. |
| D622,894 S | 8/2010 | Ngai et al. |
| 7,766,515 B2 | 8/2010 | Condon et al. |
| 7,776,236 B2 | 8/2010 | Shih et al. |
| 7,780,306 B2 | 8/2010 | Hoshi |
| 7,784,954 B1 | 8/2010 | Coleman |
| D623,793 S | 9/2010 | Ngai et al. |
| 7,798,695 B2 | 9/2010 | Parker |
| 7,806,581 B2 | 10/2010 | Lee |
| 7,810,960 B1 | 10/2010 | Soderman et al. |
| 7,810,968 B1 | 10/2010 | Walker et al. |
| 7,813,131 B2 | 10/2010 | Liang |
| 7,821,982 B2 | 10/2010 | Chen et al. |
| 7,826,698 B1 | 11/2010 | Meir et al. |
| 7,850,357 B2 | 12/2010 | Kim et al. |
| 7,857,487 B2 | 12/2010 | Wu et al. |
| 7,857,619 B2 | 12/2010 | Liu |
| D631,601 S | 1/2011 | Lodhie |
| 7,866,871 B2 | 1/2011 | Couzin et al. |
| 7,905,646 B2 | 3/2011 | Adachi et al. |
| 7,907,804 B2 | 3/2011 | Meir et al. |
| 7,914,192 B2 | 3/2011 | Coleman |
| 7,914,193 B2 | 3/2011 | Peifer et al. |
| 7,914,196 B2 | 3/2011 | Parker et al. |
| 7,929,816 B2 | 4/2011 | Meir et al. |
| 7,934,851 B1 | 5/2011 | Boissevain et al. |
| 7,967,477 B2 | 6/2011 | Bloemen et al. |
| 7,969,531 B1 | 6/2011 | Li et al. |
| 7,970,246 B2 | 6/2011 | Travis et al. |
| D641,923 S | 7/2011 | Radchenko et al. |
| 7,976,204 B2 | 7/2011 | Li et al. |
| D642,725 S | 8/2011 | Kong et al. |
| 7,991,257 B1 | 8/2011 | Coleman |
| 7,997,784 B2 | 8/2011 | Tsai |
| 8,002,450 B2 | 8/2011 | Van Ostrand et al. |
| D645,194 S | 9/2011 | Budike, Jr. et al. |
| 8,033,674 B1 | 10/2011 | Coleman et al. |
| 8,033,706 B1 | 10/2011 | Kelly et al. |
| 8,038,308 B2 | 10/2011 | Greiner |
| 8,047,696 B2 | 11/2011 | Ijzerman et al. |
| 8,052,316 B2 | 11/2011 | Lee |
| 8,054,409 B2 | 11/2011 | Hsieh et al. |
| 8,061,877 B2 | 11/2011 | Chang |
| 8,064,743 B2 | 11/2011 | Meir et al. |
| 8,067,884 B2 | 11/2011 | Li |
| 8,075,157 B2 | 12/2011 | Zhang et al. |
| 8,087,807 B2 | 1/2012 | Liu et al. |
| 8,092,068 B2 | 1/2012 | Parker et al. |
| 8,096,671 B1 | 1/2012 | Cronk et al. |
| 8,096,681 B2 | 1/2012 | Fang et al. |
| D654,618 S | 2/2012 | Kong et al. |
| 8,113,704 B2 | 2/2012 | Bae et al. |
| 8,128,272 B2 | 3/2012 | Fine et al. |
| 8,129,731 B2 | 3/2012 | Vissenberg et al. |
| 8,152,339 B2 | 4/2012 | Morgan |
| 8,152,352 B2 | 4/2012 | Richardson |
| 8,162,524 B2 | 4/2012 | Van Ostrand et al. |
| D659,880 S | 5/2012 | Maxik et al. |
| 8,172,447 B2 | 5/2012 | Meir et al. |
| 8,177,408 B1 | 5/2012 | Coleman |
| 8,182,128 B2 | 5/2012 | Meir et al. |
| 8,186,847 B2 | 5/2012 | Hu et al. |
| 8,189,973 B2 | 5/2012 | Travis et al. |
| D662,255 S | 6/2012 | Kluś |
| D662,256 S | 6/2012 | Kluś |
| D662,643 S | 6/2012 | Takahashi et al. |
| 8,192,051 B2 | 6/2012 | Dau et al. |
| 8,198,109 B2 | 6/2012 | Lerman et al. |
| 8,210,716 B2 | 7/2012 | Lerman et al. |
| 8,218,920 B2 | 7/2012 | Van Ostrand et al. |
| 8,220,955 B2 | 7/2012 | Kwak et al. |
| 8,220,980 B2 | 7/2012 | Gingrich, III |

(56) References Cited

U.S. PATENT DOCUMENTS

| | | |
|---|---|---|
| 8,226,287 B2 | 7/2012 | Teng et al. |
| 8,231,256 B1 | 7/2012 | Coleman et al. |
| 8,231,258 B2 | 7/2012 | Kim et al. |
| 8,231,259 B2 | 7/2012 | Keller et al. |
| 8,242,518 B2 | 8/2012 | Lerman et al. |
| 8,246,187 B2 | 8/2012 | Cheong et al. |
| 8,246,197 B2 | 8/2012 | Huang |
| 8,249,408 B2 | 8/2012 | Coleman |
| 8,258,524 B2 | 9/2012 | Tan et al. |
| 8,272,756 B1 | 9/2012 | Patrick |
| 8,272,770 B2 | 9/2012 | Richardson |
| 8,277,106 B2 | 10/2012 | Van Gorkom et al. |
| 8,282,261 B2 | 10/2012 | Pance et al. |
| 8,283,853 B2 | 10/2012 | Yan et al. |
| 8,287,152 B2 | 10/2012 | Gill |
| 8,292,467 B2 | 10/2012 | Vissenberg et al. |
| 8,297,786 B2 | 10/2012 | Shani et al. |
| 8,297,801 B2 | 10/2012 | Coushaine et al. |
| 8,297,818 B2 | 10/2012 | Richardson |
| 8,301,002 B2 | 10/2012 | Shani |
| D670,422 S | 11/2012 | Siekmann |
| 8,314,566 B2 | 11/2012 | Steele et al. |
| 8,317,363 B2 | 11/2012 | Zheng |
| 8,317,366 B2 | 11/2012 | Dalton et al. |
| 8,319,130 B2 | 11/2012 | Lee et al. |
| 8,328,403 B1 | 12/2012 | Morgan et al. |
| 8,328,406 B2 | 12/2012 | Zimmerman |
| 8,331,746 B2 | 12/2012 | Bogner et al. |
| 8,338,199 B2 | 12/2012 | Lerman et al. |
| 8,338,839 B2 | 12/2012 | Lerman et al. |
| 8,338,840 B2 | 12/2012 | Lerman et al. |
| 8,338,841 B2 | 12/2012 | Lerman et al. |
| 8,338,842 B2 | 12/2012 | Lerman et al. |
| 8,344,397 B2 | 1/2013 | Lerman et al. |
| 8,348,446 B2 | 1/2013 | Nakamura |
| 8,351,744 B2 | 1/2013 | Travis et al. |
| 8,353,606 B2 | 1/2013 | Jeong |
| 8,369,678 B2 | 2/2013 | Chakmakjian et al. |
| 8,382,354 B2 | 2/2013 | Kim et al. |
| 8,382,387 B1 | 2/2013 | Sandoval |
| 8,388,173 B2 | 3/2013 | Sloan et al. |
| 8,388,190 B2 | 3/2013 | Li et al. |
| 8,398,259 B2 | 3/2013 | Kwak et al. |
| 8,398,262 B2 | 3/2013 | Sloan et al. |
| D679,444 S | 4/2013 | Vasylyev |
| D681,262 S | 4/2013 | Lee |
| 8,408,737 B2 | 4/2013 | Wright et al. |
| 8,410,726 B2 | 4/2013 | Dau et al. |
| 8,412,010 B2 | 4/2013 | Ghosh et al. |
| 8,414,154 B2 | 4/2013 | Dau et al. |
| 8,419,224 B2 | 4/2013 | Wan-Chih et al. |
| 8,430,536 B1 | 4/2013 | Zhao |
| 8,430,548 B1 | 4/2013 | Kelly et al. |
| 8,432,628 B2 | 4/2013 | Shaiu et al. |
| 8,434,892 B2 | 5/2013 | Zwak et al. |
| 8,434,893 B2 | 5/2013 | Boyer et al. |
| 8,434,913 B2 | 5/2013 | Vissenberg et al. |
| 8,434,914 B2 | 5/2013 | Li et al. |
| 8,449,128 B2 | 5/2013 | Ko et al. |
| 8,449,142 B1 | 5/2013 | Martin et al. |
| 8,454,218 B2 | 6/2013 | Wang et al. |
| 8,461,602 B2 | 6/2013 | Lerman et al. |
| 8,469,559 B2 | 6/2013 | Williams |
| 8,475,010 B2 | 7/2013 | Vissenberg et al. |
| 8,482,186 B2 * | 7/2013 | Wang et al. .................. 313/116 |
| 8,485,684 B2 | 7/2013 | Lou et al. |
| 8,506,112 B1 | 8/2013 | Dau et al. |
| 8,534,896 B2 | 9/2013 | Boonekamp |
| 8,534,901 B2 | 9/2013 | Panagotacos et al. |
| 8,547,022 B2 | 10/2013 | Summerford et al. |
| 8,567,983 B2 | 10/2013 | Boyer et al. |
| 8,567,986 B2 | 10/2013 | Szprengiel et al. |
| 8,573,823 B2 | 11/2013 | Dau et al. |
| 8,585,253 B2 | 11/2013 | Duong et al. |
| 8,591,072 B2 | 11/2013 | Shani et al. |
| 8,593,070 B2 | 11/2013 | Wang et al. |
| D695,447 S | 12/2013 | Speier et al. |
| 8,598,778 B2 | 12/2013 | Allen et al. |
| 8,602,586 B1 | 12/2013 | Dau et al. |
| 8,608,351 B2 | 12/2013 | Peifer |
| 8,632,214 B1 | 1/2014 | Tickner et al. |
| 8,641,219 B1 | 2/2014 | Johnson et al. |
| 8,657,479 B2 | 2/2014 | Morgan et al. |
| 8,696,173 B2 | 4/2014 | Urtiga et al. |
| 8,724,052 B2 | 5/2014 | Hsieh et al. |
| 8,755,005 B2 | 6/2014 | Bierhuizen et al. |
| 8,833,999 B2 | 9/2014 | Wang et al. |
| 8,840,276 B2 | 9/2014 | Shani et al. |
| 8,851,712 B2 | 10/2014 | Shani et al. |
| 8,864,360 B2 | 10/2014 | Parker et al. |
| 8,870,431 B2 | 10/2014 | Lin et al. |
| 8,882,323 B2 | 11/2014 | Solomon et al. |
| 8,905,569 B2 | 12/2014 | Thomas et al. |
| 8,915,611 B2 | 12/2014 | Zhang |
| 8,917,962 B1 | 12/2014 | Nichol et al. |
| 8,960,969 B2 | 2/2015 | Freund |
| 2001/0019479 A1 | 9/2001 | Nakabayashi et al. |
| 2002/0061178 A1 | 5/2002 | Winston et al. |
| 2002/0172039 A1 | 11/2002 | Inditsky |
| 2004/0008952 A1 | 1/2004 | Kragl |
| 2004/0080938 A1 | 4/2004 | Holman et al. |
| 2004/0135933 A1 | 7/2004 | Leu et al. |
| 2004/0213003 A1 | 10/2004 | Lauderdale et al. |
| 2004/0240217 A1 | 12/2004 | Rice |
| 2005/0111235 A1 | 5/2005 | Sukuzi et al. |
| 2005/0201103 A1 | 9/2005 | Saccomanno et al. |
| 2005/0210643 A1 | 9/2005 | Mezei et al. |
| 2006/0002146 A1 | 1/2006 | Baba |
| 2006/0147151 A1* | 7/2006 | Wanninger ............ G02B 6/003 385/31 |
| 2006/0262521 A1 | 11/2006 | Piepgras et al. |
| 2007/0081780 A1 | 4/2007 | Scholl |
| 2007/0086179 A1 | 4/2007 | Chen et al. |
| 2007/0121340 A1 | 5/2007 | Hoshi |
| 2007/0139905 A1 | 6/2007 | Birman et al. |
| 2007/0189033 A1 | 8/2007 | Watanabe et al. |
| 2007/0245607 A1 | 10/2007 | Awai et al. |
| 2007/0253058 A1 | 11/2007 | Wood |
| 2007/0274654 A1 | 11/2007 | Choudhury et al. |
| 2008/0037284 A1 | 2/2008 | Rudisill |
| 2008/0137695 A1 | 6/2008 | Takahashi et al. |
| 2008/0186273 A1 | 8/2008 | Krijn et al. |
| 2008/0192458 A1 | 8/2008 | Li |
| 2009/0103293 A1 | 4/2009 | Harbers et al. |
| 2009/0196071 A1 | 8/2009 | Matheson et al. |
| 2009/0257242 A1 | 10/2009 | Wendman |
| 2009/0297090 A1 | 12/2009 | Bogner et al. |
| 2009/0309494 A1 | 12/2009 | Patterson et al. |
| 2010/0027257 A1 | 2/2010 | Boonekamp et al. |
| 2010/0046219 A1 | 2/2010 | Pijlman et al. |
| 2010/0073597 A1 | 3/2010 | Bierhuizen et al. |
| 2010/0079843 A1 | 4/2010 | Derichs et al. |
| 2010/0079980 A1 | 4/2010 | Sakai |
| 2010/0128483 A1 | 5/2010 | Reo et al. |
| 2010/0133422 A1 | 6/2010 | Lin et al. |
| 2010/0208460 A1 | 8/2010 | Ladewig et al. |
| 2010/0220484 A1 | 9/2010 | Shani et al. |
| 2010/0220497 A1 | 9/2010 | Ngai |
| 2010/0231143 A1 | 9/2010 | May et al. |
| 2010/0238645 A1 | 9/2010 | Bailey |
| 2010/0238671 A1 | 9/2010 | Catone et al. |
| 2010/0302218 A1 | 12/2010 | Bita et al. |
| 2010/0302616 A1 | 12/2010 | Bita et al. |
| 2010/0302783 A1 | 12/2010 | Shastry et al. |
| 2010/0302803 A1 | 12/2010 | Bita et al. |
| 2010/0320904 A1 | 12/2010 | Meir |
| 2010/0328936 A1 | 12/2010 | Pance et al. |
| 2011/0007505 A1 | 1/2011 | Wang et al. |
| 2011/0037388 A1 | 2/2011 | Lou et al. |
| 2011/0044582 A1 | 2/2011 | Travis et al. |
| 2011/0058372 A1 | 3/2011 | Lerman et al. |
| 2011/0063830 A1 | 3/2011 | Narendran et al. |
| 2011/0063838 A1 | 3/2011 | Dau et al. |
| 2011/0063855 A1 | 3/2011 | Vissenberg |

(56) References Cited

U.S. PATENT DOCUMENTS

| | | |
|---|---|---|
| 2011/0163681 A1 | 7/2011 | Dau et al. |
| 2011/0163683 A1 | 7/2011 | Steele et al. |
| 2011/0170289 A1 | 7/2011 | Allen et al. |
| 2011/0180818 A1 | 7/2011 | Lerman et al. |
| 2011/0193105 A1 | 8/2011 | Lerman et al. |
| 2011/0193106 A1 | 8/2011 | Lerman et al. |
| 2011/0193114 A1 | 8/2011 | Lerman et al. |
| 2011/0195532 A1 | 8/2011 | Lerman et al. |
| 2011/0198631 A1 | 8/2011 | Lerman et al. |
| 2011/0198632 A1 | 8/2011 | Lerman et al. |
| 2011/0199769 A1 | 8/2011 | Bretschneider et al. |
| 2011/0204390 A1 | 8/2011 | Lerman et al. |
| 2011/0204391 A1 | 8/2011 | Lerman et al. |
| 2011/0210861 A1 | 9/2011 | Winton et al. |
| 2011/0228527 A1 | 9/2011 | Van Gorkom et al. |
| 2011/0233568 A1 | 9/2011 | An et al. |
| 2011/0249467 A1 | 10/2011 | Boonekamp |
| 2011/0273079 A1 | 11/2011 | Pickard et al. |
| 2011/0273882 A1 | 11/2011 | Pickard |
| 2011/0280043 A1 | 11/2011 | Van Ostrand et al. |
| 2011/0299807 A1 | 12/2011 | Kim et al. |
| 2011/0305018 A1 | 12/2011 | Angelini et al. |
| 2011/0305027 A1 | 12/2011 | Ham |
| 2011/0317436 A1 | 12/2011 | Kuan |
| 2012/0008338 A1 | 1/2012 | Ono et al. |
| 2012/0026728 A1 | 2/2012 | Lou et al. |
| 2012/0033445 A1 | 2/2012 | Desmet et al. |
| 2012/0039073 A1 | 2/2012 | Tong |
| 2012/0051041 A1 | 3/2012 | Edmond et al. |
| 2012/0068615 A1 | 3/2012 | Duong |
| 2012/0113676 A1 | 5/2012 | Van Dijk et al. |
| 2012/0120651 A1 | 5/2012 | Peck |
| 2012/0152490 A1 | 6/2012 | Wen et al. |
| 2012/0170266 A1 | 7/2012 | Germain et al. |
| 2012/0170316 A1 | 7/2012 | Lee et al. |
| 2012/0170318 A1 | 7/2012 | Tsai et al. |
| 2012/0182767 A1 | 7/2012 | Pectavich et al. |
| 2012/0212957 A1 | 8/2012 | Hyun et al. |
| 2012/0230019 A1 | 9/2012 | Peifer |
| 2012/0236595 A1 | 9/2012 | Parker et al. |
| 2012/0250296 A1 | 10/2012 | Lu et al. |
| 2012/0250319 A1 | 10/2012 | Dau et al. |
| 2012/0257383 A1 | 10/2012 | Zhang |
| 2012/0268931 A1 | 10/2012 | Lerman et al. |
| 2012/0268932 A1 | 10/2012 | Lerman et al. |
| 2012/0287619 A1 | 11/2012 | Pickard et al. |
| 2012/0287654 A1 | 11/2012 | He et al. |
| 2012/0298181 A1 | 11/2012 | Cashion et al. |
| 2012/0320626 A1 | 12/2012 | Quilici et al. |
| 2012/0326614 A1 | 12/2012 | Tsuji et al. |
| 2013/0010464 A1 | 1/2013 | Shuja et al. |
| 2013/0037838 A1 | 2/2013 | Speier et al. |
| 2013/0038195 A1 | 2/2013 | Petroski et al. |
| 2013/0038219 A1 | 2/2013 | Dau et al. |
| 2013/0039050 A1 | 2/2013 | Dau et al. |
| 2013/0044480 A1 | 2/2013 | Sato et al. |
| 2013/0077298 A1 | 3/2013 | Steele et al. |
| 2013/0128593 A1 | 5/2013 | Luo |
| 2013/0170210 A1 | 7/2013 | Athalye |
| 2013/0201715 A1 | 8/2013 | Dau et al. |
| 2013/0208461 A1 | 8/2013 | Warton et al. |
| 2013/0208495 A1 | 8/2013 | Dau et al. |
| 2013/0214300 A1 | 8/2013 | Lerman et al. |
| 2013/0215612 A1 | 8/2013 | Garcia |
| 2013/0223057 A1 | 8/2013 | Gassner et al. |
| 2013/0229804 A1 | 9/2013 | Holder et al. |
| 2013/0229810 A1 | 9/2013 | Pelka et al. |
| 2013/0250584 A1 | 9/2013 | Wang et al. |
| 2013/0279198 A1 | 10/2013 | Lin et al. |
| 2013/0294059 A1 | 11/2013 | Galluccio et al. |
| 2013/0294063 A1 | 11/2013 | Lou et al. |
| 2013/0343045 A1 | 12/2013 | Lodhie et al. |
| 2013/0343055 A1 | 12/2013 | Eckert et al. |
| 2013/0343079 A1 | 12/2013 | Unger et al. |
| 2014/0003041 A1 | 1/2014 | Dau et al. |
| 2014/0029257 A1 | 1/2014 | Boyer et al. |
| 2014/0036510 A1 | 2/2014 | Preston et al. |
| 2014/0071687 A1 | 3/2014 | Tickner et al. |
| 2014/0133172 A1 | 5/2014 | Vissenberg et al. |
| 2014/0168955 A1 | 6/2014 | Gershaw |
| 2014/0268879 A1 | 9/2014 | Mizuyama et al. |
| 2014/0334126 A1 | 11/2014 | Speier et al. |
| 2015/0003059 A1 | 1/2015 | Haitz et al. |
| 2015/0049507 A1 | 2/2015 | Shani et al. |

FOREIGN PATENT DOCUMENTS

| | | | |
|---|---|---|---|
| DE | 10047101 | 5/2002 | |
| DE | 10203106 | 7/2003 | |
| DE | 10302563 | 7/2004 | |
| DE | 10302564 | 7/2004 | |
| DE | 102006009325 | 9/2007 | |
| DE | 102006011296 | 9/2007 | |
| DE | 102006013343 | 9/2007 | |
| JP | H10173870 | 6/1998 | |
| JP | 2000147264 | 5/2000 | |
| JP | 3093080 U | 12/2005 | |
| JP | 2006131444 | 5/2006 | |
| WO | WO 96/21122 | 7/1996 | |
| WO | WO 96/21884 | 7/1996 | |
| WO | WO 99/4531 | 1/1999 | |
| WO | WO 2003/031869 | 4/2003 | |
| WO | WO 2009012484 | 1/2009 | |
| WO | WO 2009057845 A1 * | 5/2009 | ........... G02B 6/0036 |
| WO | WO 2011/130648 | 10/2011 | |
| WO | WO 2013/078463 | 5/2013 | |
| WO | WO 2013/082537 | 6/2013 | |

OTHER PUBLICATIONS

Web page at http://www.oluce.com/en/lamps/table/colombo-281-detail, printed Nov. 19, 2013 (2 pages).

International Search Report and Written Opinion for International Application No. PCT/US2014/013408, dated Jul. 17, 2014, Applicant, Cree, Inc. (21 pages).

Invitation to Pay Additional Fees for International Application No. PCT/US2014/013408, dated May 8, 2014, Applicant, Cree, Inc. (2 pages).

International Search Report and Written Opinion dated Jul. 24, 2014, for International Application No. PCT/US2014/28887, Applicant, Cree, Inc. (15 pages).

International Search Report and Written Opinion for International Application No. PCT/US2014/013840, dated Jul. 28, 2014, Applicant, Cree, Inc. (17 pages).

Invitation to Pay Additional Fees for International Application No. PCT/US2014/013840, dated May 8, 2014, Applicant, Cree, Inc. (2 pages).

U.S. Appl. No. 13/657,421, filed Oct. 22, 2012 (38 pages).

Web page at http://www.fusionoptix.com/lighting/components/array-optics.htm, printed May 9, 2013 (2 pages).

Drain, Kieran, "Transformations in Lighting: 2011 DOE Solid-State Lighting R&D Workshop, Panel 3: Novel Lighting Concepts for Large Interior Spaces," PowerPoint presentation printed Nov. 2013 (23 pages).

Ji et al., Electrically Controllable Microlens Array Fabricated by Anisotropic Phase Separation From Liquid-Crystal and Polymer Composite Materials, Jul. 1, 2003 (4 pages).

Iijima et al., Document scanner using polymer waveguides with a microlens array, Oct. 28, 2002 (4 pages).

* cited by examiner

SHAPED OPTICAL WAVEGUIDE BODIES

CROSS-REFERENCE TO RELATED PATENT APPLICATIONS

This patent application incorporates by reference co-pending U.S. patent application Ser. No. 13/842,521, filed Mar. 15, 2013 and assigned to Cree, Inc.

FIELD OF THE INVENTION

This invention pertains to optical waveguides and, more particularly, to shaped optical waveguide bodies.

BACKGROUND OF THE INVENTION

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

U.S. Pat. No. 5,812,714 (Hulse) discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face.

U.S. Pat. No. 5,613,751 (Parker et al.) discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light emitting panel. A pattern of light extracting deformities, or any change in the shape or geometry of the panel surface, and/or a coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

BRIEF SUMMARY OF THE INVENTION

Disclosed is a lighting device having an optical waveguide body that includes an input at a first end of the waveguide body and first and second side surfaces. At least one LED which produces light when energized and the light is coupled into the input. The first side surface comprises at least one tapered surface that extends toward the second side surface, and an end of the optical waveguide body away from the input is directed toward a surface to be illuminated.

Also disclosed is a second optical waveguide body that intersects with the first waveguide body. The second waveguide body includes an input at a first end of the second waveguide body and first and second side surfaces. The first side surface has at least one tapered surface extending toward the second side surface, and an end of the second optical waveguide body away from the input is directed toward the surface to be illuminated.

Disclosed, too, is an optical waveguide body having a first surface that includes one or more tapered portions between an input surface and an end surface or edge. A second surface displaced from and opposite the first surface may also include one or more tapered portions between the input surface wherein the furthest tapered portions of the first and second surface forms and end surface or edge. In one embodiment disclosed, herein, the second surface is a flat surface that extends parallel to a center axis of the waveguide body and forms an end surface or edge with the first surface.

DETAILED DESCRIPTION OF THE INVENTION

Figure 1:
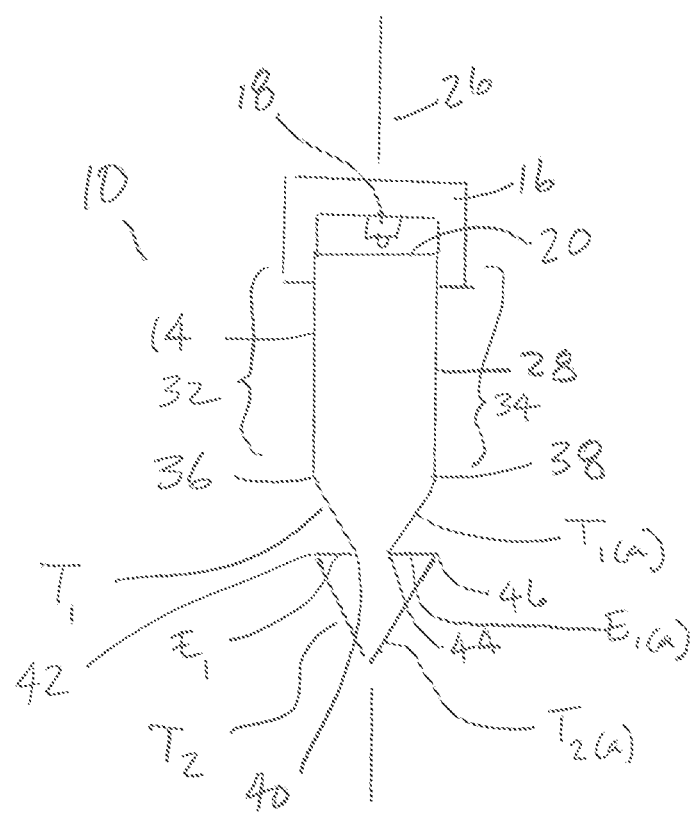
FIG. 1 is a side view of an embodiment of a shaped waveguide.

In general, the curvature and/or other shape of a waveguide body 10 and/or the shape, size, and/or spacing of extraction features 12 determine the particular light extraction distribution. All of these options affect the visual uniformity from one end of the waveguide 10 to another. For example, a waveguide body 10 having smooth surfaces may emit light at curved portions thereof. The sharper the curve is the more light is extracted. The extraction of light along a curve also depends on the thickness of the waveguide body 10. Light can travel through tight curves of a thin waveguide body 10 without reaching the critical angle, whereas light that travels through a thick waveguide body 10 is more likely to strike the surface 14 at an angle greater than the critical angle and escape.

Tapering a waveguide body 10 causes light to reflect internally along the length of the waveguide body 10 while increasing the angle of incidence. Eventually, this light strikes one side at an angle that is acute enough to escape. The opposite example, i.e., a gradually thickening waveguide body 10 over the length thereof, causes light to collimate along the length with fewer and fewer interactions with the waveguide body walls. These reactions can be used to extract and control light within the waveguide 10. When combined with dedicated extraction features 12, tapering allows one to change the incident angular distribution across an array of features. This, in turn, controls how much, and in what direction light is extracted. Thus, a select combination of curves, tapered surfaces, and extraction features can achieve a desired illumination and appearance.

Still further, the waveguide bodies 10 contemplated herein are made of an acrylic material, a silicone, a polycarbonate, or other suitable material(s) to achieve a desired effect and/or appearance.

FIGS. 1-12 and 14-19, disclosed a lighting device that is comprised of an optical waveguide body 10 having an input 20 at a first end of the waveguide body 10 and first and second side surfaces 14, 28. At least one LED 18 which produces light when energized and the light is coupled into the input 20. The first side surface 14 is comprised of at least one tapered surface $T_1$ extending toward the second side surface 28, and an end 22 of the optical waveguide body 10 away from the input 20 is directed toward a surface 62 to be illuminated.

Figure 2:
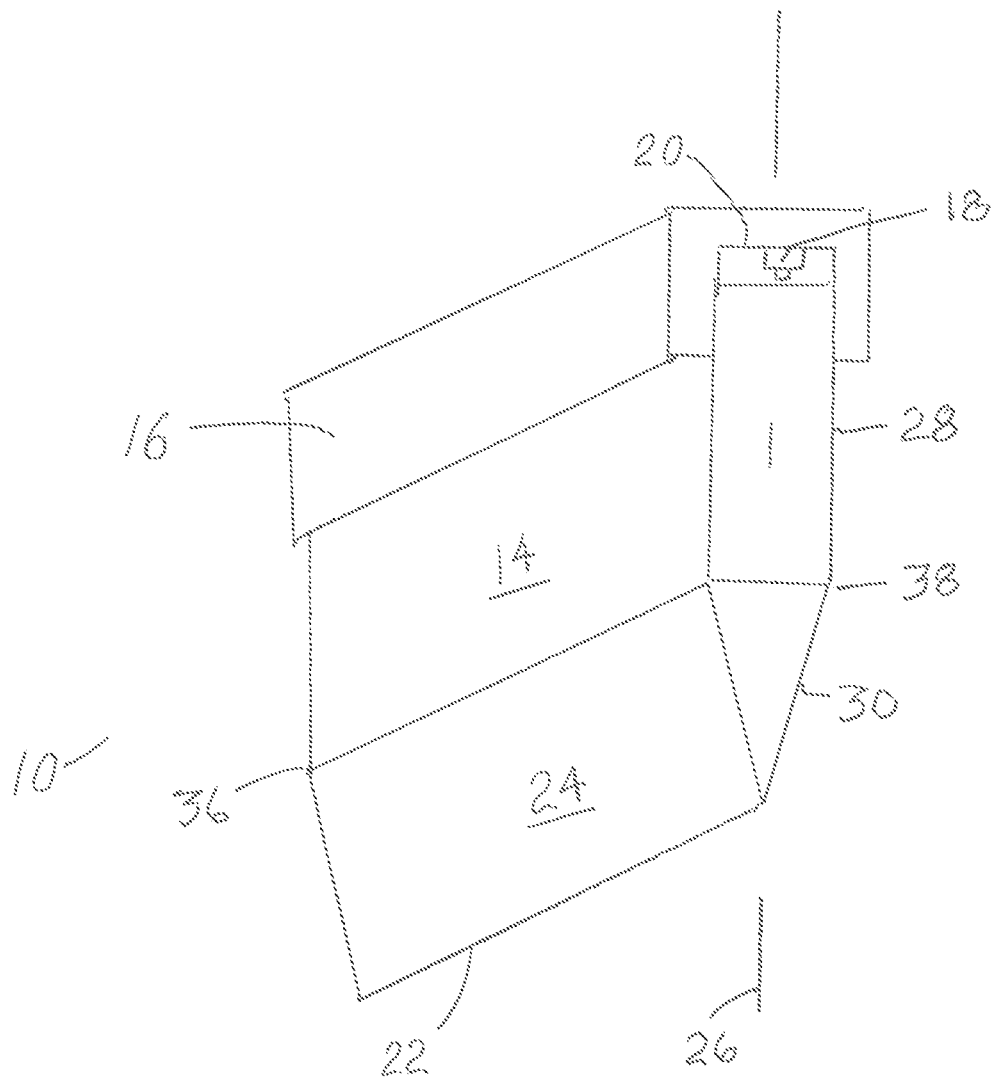
FIG. 2 is an isometric view showing an embodiment of a shaped waveguide.
Figure 3:
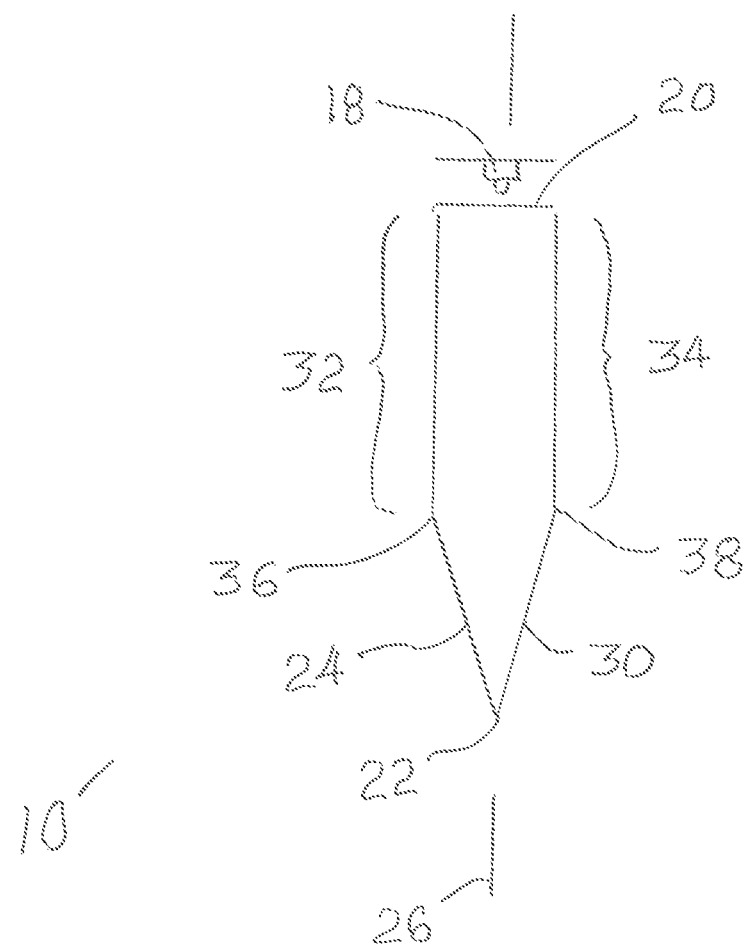
FIG. 3 is a side view of an embodiment of a shaped waveguide.
Figure 5:
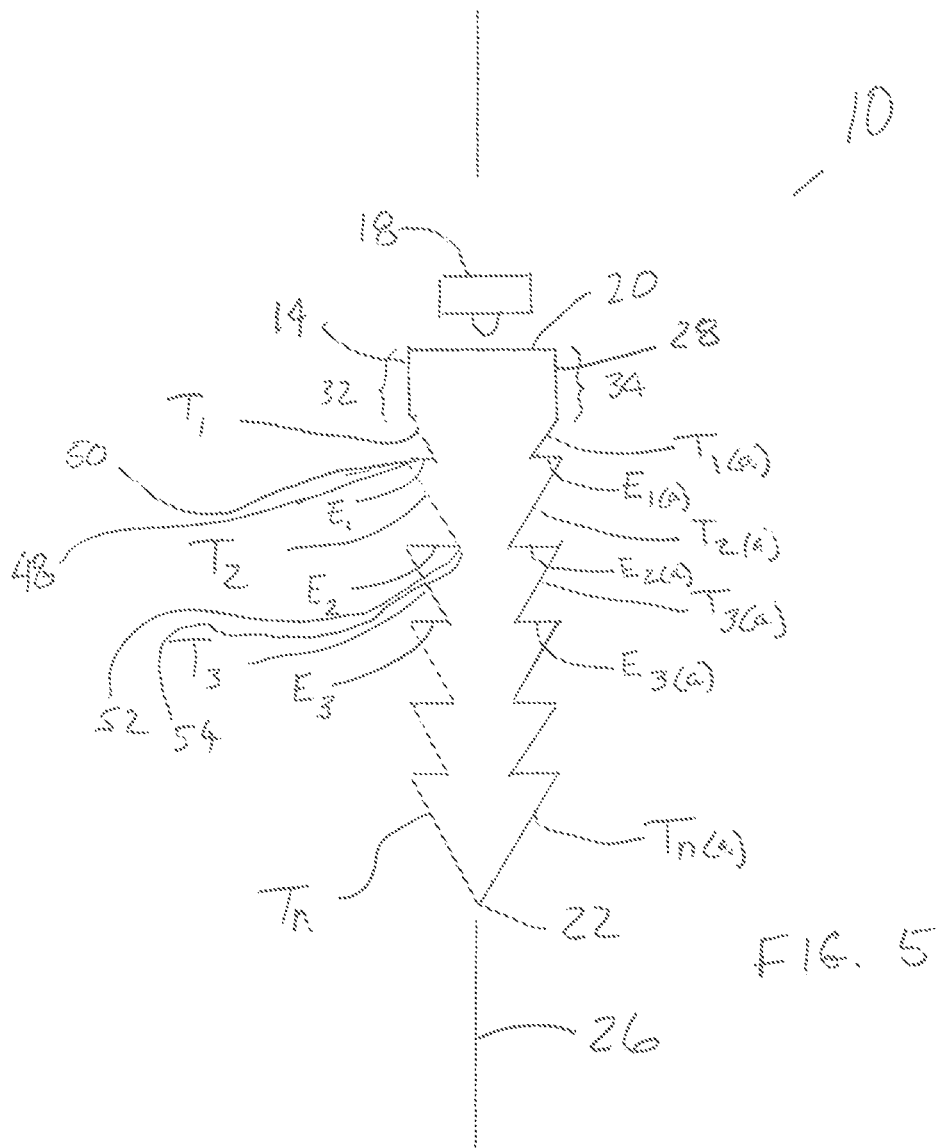
FIG. 5 is a side view of an embodiment of a shaped waveguide having a plurality of tapered extraction features.

In a particular version of the embodiment, at least one LED 18 is mounted pointing into the input 20 of the waveguide body 10, as is shown in FIGS. 1-3. In a more particular version of the embodiment, the second surface 14 comprises at least one tapered surface $T_1$ that extends toward the first side surface 14. In still another version of the embodiment, the first side surface 14 comprises a plurality of tapered portions $T_1, T_2, T_3 \ldots T_n$ extending toward the second side surface 28, as shown in FIG. 5. In such an embodiment, the second side surface 28 comprises a plurality of tapered portions $T_1, T_2, T_3 \ldots T_n$ extending toward the first side surface 14. In a particular version of such embodiment, a tapered portion $T_n$ of the first side surface 14 and a tapered portion $T_n$ of the second side surface 28 meet at the end 22 of the waveguide body 10.

Figure 13:
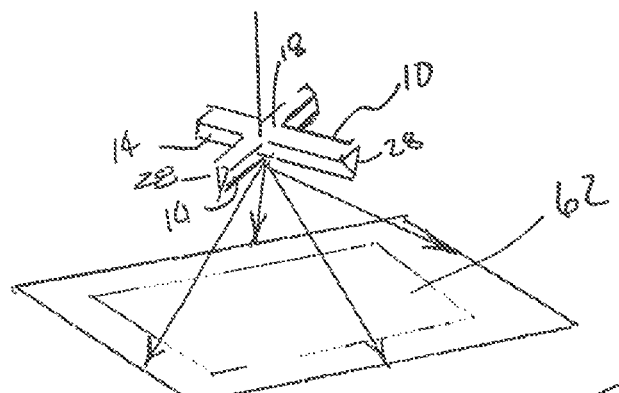
FIG. 13 is an isometric view of an embodiment of crossed waveguides lighting a surface area.

In yet another version of an embodiment of the lighting device, as shown in FIG. 13, at least a second optical waveguide body 10 intersects with the first waveguide body 10. The second waveguide body 10 comprises an input 20 at a first end of the second waveguide body 10 and first and second side surfaces 14, 28. The first side surface 14 comprises at least one tapered surface $T_1$ that extends toward the second side surface 28. In such an embodiment, an end 22 of the second optical waveguide body 10 that is away from the input 20 is directed toward a surface 62 to be illuminated.

Also disclosed is a lighting device comprised of an optical waveguide body 10 having an input 20 at a first end of the waveguide body 10 and first and second surfaces 14, 28. A first side surface 14 is comprised of at least one tapered surface $T_1$ extending toward the second side surface 28, and an end 22 of the optical waveguide body 10 away from the input 20 is directed toward a surface 62 to be illuminated.

Figure 4:
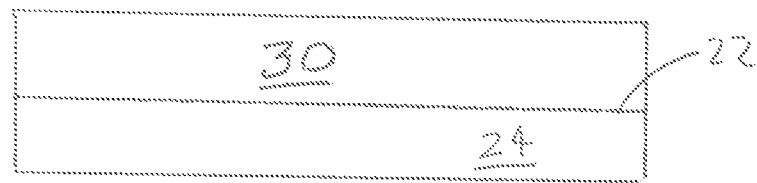
FIG. 4 is a bottom view of a shaped waveguide.
Figure 8:
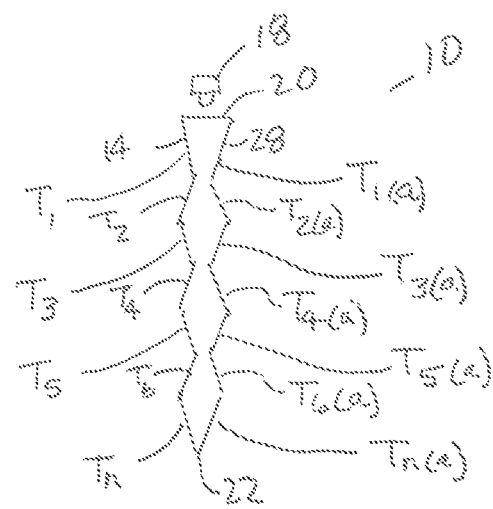
FIG. 8 is a side view of an embodiment of a waveguide.

In an embodiment, at least one LED 18 which products light when energized and the light is coupled to the input 20. In another version of the embodiment, the at least one LED 18 is mounted pointing into the input 20 of the waveguide body 10. In a more particular version of the embodiment, the second surface 28 is comprised of at least one tapered surface $T_1$ extending toward the first side surface 14, as shown in FIGS. 2-4. In still another embodiment, the first side surface 14 is comprised a plurality of tapered portions $T_1, T_2, T_3 \ldots T_n$ extending toward the second side surface 28. In a particular version of this embodiment, the second side surface 28 comprises a plurality of tapered portions $T_{1(a)}, T_{2(a)}, T_{3(a)} \ldots T_{n(a)}$ extending toward the first side surface 14. In still another version of the embodiment, a tapered portion $T_n$ of the first side surface 14 and a tapered portion $T_{n(a)}$ of the second side surface 28 meet at the end 22 of the waveguide body 10, as shown in FIG. 8.

In still another embodiment of the lighting device, at least a second optical waveguide body 10 intersects with the first waveguide body 10, as shown in FIG. 13. In this embodiment, the second waveguide body 10 comprises an input 20 at a first end of the second waveguide body 10 and first and second side surfaces 14, 28. The first side surface 14 comprises at least one tapered surface $T_1$ that extends toward the second side surface 28, and an end 22 of the second optical waveguide body 10 away from the input 20 is directed toward the surface 62 to be illuminated.

In another embodiment of the lighting device, an intermediate surface $E_1, E_2, E_3, \ldots E$ is positioned between each of the plurality of tapered surfaces $T_1, T_2, T_3 \ldots T_n$ of the waveguide body 10, as shown in FIG. 5. In one version of this embodiment, the intermediate surface $E_1$ is substantially normal to a central axis 26 of the waveguide 10. The intermediate surface $E_1$ may also be a curved surface or a straight surface. In another embodiment, the intermediate surface $E_1$ may be a straight surface tapered in the opposite direction of the each of the plurality of tapered surfaces $T_1, T_2, T_3 \ldots T_n$. In still another version, the tapered surface $T_1$ forms an acute angle with the first surface 14. In yet another embodiment, the tapered surface $T_n$ of the first surface 14 forms an edge 22 with the second surface 28.

In still another embodiment, as shown in FIGS. 16-19 of the lighting device, the waveguide body 10 includes a plurality of tapered surfaces $T_1, T_2, T_3 \ldots T_n$ that form an acute angle with the first surface 14. In yet another embodiment, the first surface 14 is comprised of a plurality of straight surfaces 14. Each one of the plurality of straight surfaces 14 is separated by a tapered surface $T_1, T_2, T_3 \ldots T_n$, and each one of the tapered surfaces $T_1, T_2, T_3 \ldots T_n$ form an acute angle with respect to each of the, respective, straight surfaces 14.

In an embodiment, an optical waveguide body 10 of the lighting device is comprised of a first surface 14 that extends between an input surface 20 and an end surface 22. As shown in FIG. 1, the first surface 14 has at least two tapered portions $T_1$ and $T_2$ that extend inward from an outer portion of the first surface 14. An intermediate surface $E_1$ is located between each of the at least two tapered portions $T_1$ and $T_2$. In an embodiment, each of the at least two tapered portions $T_1$ and $T_2$ are distal from the input surface 20. In yet another embodiment, each of the at least two tapered portions $T_1$ and $T_2$ extend toward a central axis 26 of the waveguide body 10. In still a more particular embodiment, the waveguide body 10 includes a second surface 28 opposite of and distal from the first surface 14.

The intermediate surface 39 of the waveguide body 10 may be substantially normal to the central axis 26 of the waveguide 10, as shown in FIG. 1. In another embodiment, the intermediate surface $E_1$ may be a curved surface. In yet another embodiment, the intermediate surface $E_1$ is a straight surface. In still another embodiment, as shown in FIG. 8, the intermediate surface (shown as $T_3$ in FIG. 8) is a straight surface tapered in the opposite direction of the each of the at least two tapered portions $T_1$ and $T_2$.

In an embodiment, the second surface 28 terminates in an end surface 22 with the first surface 14. Depending on the design of the waveguide body 10, the end surface 22 could be an edge (as shown in FIG. 1), a curved surface, a smooth surface, or any type of geometrically shaped surface.

A light source 18 is located adjacent and external to the input surface 20 of the waveguide body 10. In an embodiment, the light source 18 may be a light emitting diode (LED). When in operation, light from the light source 18 is emitted through each of the at least two tapered portions $T_1$ and $T_2$.

As shown in FIGS. 2-4, another embodiment of a waveguide comprises a coupling chamber 16 attached to a main waveguide body 10. At least one light source 18, such as one or more LEDs, is disposed adjacent to the coupling chamber 16. The light source 18 may be a white LED or may comprise multiple LEDs including a phosphor-coated LED either alone or in combination with a color LED, such as a green LED, etc. In those cases where a soft white illumination is to be produced, the light source 18 typically includes a blue shifted yellow LED and a red LED. Different color temperatures and appearances could be produced using other LED combinations, as is known in the art. In one embodiment, the light source 18 comprises any LED, for example, an MT-G LED incorporating TrueWhite® LED technology as developed and manufactured by Cree, Inc., the assignee of the present application.

As shown in FIGS. 2-4, in one embodiment, the waveguide body 10 is comprised of a first surface 14 that extends between an input surface 20 and an end surface 22. The first surface 14 has a tapered portion 24 distal from the input surface 20 that extends toward a central axis 26 of the waveguide 10, and a second surface 28 displaced from and opposite the first surface 14. The second surface 28 has a tapered portion 30 distal from the input surface 20 that extends toward and forms an end surface or edge 22 with the tapered portion 24 of the first surface 14. In an embodiment, the first surface 14 has a first portion 32 proximal to the input surface 20, and the first portion 32 extends away from the input surface 20 parallel to the central axis 26 of the waveguide 10. The second surface 28 has a first portion 34 proximal to the input surface 20 and opposite the first portion 32 of the first surface 14. The tapered portion 24 of the first surface 14 extends from an end 36 of the first portion 32 of the first surface 14 distal to the input surface 20 and toward the central axis 26 of the waveguide 10. The tapered portion 30 of the second surface 28 extends from an end 38 of the first portion 32 of the second surface 28 distal to the input surface 20 toward the central axis 26 of the waveguide 10, wherein it forms the edge 22 with the tapered portion 24 of the first surface 14.

In another embodiment, as shown in FIG. 1, the first surface 14 has a first portion 32 proximal to the input surface 20. This first portion 32 extends away from the input surface 20 parallel to the central axis 26 of the waveguide 10. A first tapered portion $T_1$ of the first surface 14 extends toward the axis 26 of the waveguide 10 from an end 36 of the first portion 32 of the first surface 14 distal to the input surface 20. A first edge portion $E_1$ extends away from the axis 26 from an end 40 of the first tapered portion $T_1$ distal to the input surface 20. A second tapered portion $T_2$ of the first surface 14 extends from an end of the first edge portion 42 distal to the axis 26 and angles toward the axis 26 of the waveguide 10. The second surface 28 is a mirror image of the first surface 14 in that it has a first portion 34 proximal to the input surface 20 and opposite the first portion 32 of the first surface 14. A first tapered portion $T_{1(a)}$ of the second surface 28 extends toward the axis 26 of the waveguide 10 from an end 38 of the first portion 34 of the second surface 28 distal to the input surface 20. A first edge portion $E_{1(a)}$ extends away from the central axis 26 from an end 44 of the first tapered portion $T_{1(a)}$ distal to the input surface 20 while a second tapered portion $T_{2(a)}$ of the second surface 28 extends from an end 46 of the first edge portion $E_{1(a)}$ distal to the axis 26 and angles toward the axis 26 of the waveguide 10.

In still another version of the embodiment, the second surface 28 which is opposite the first surface 14 forms an end surface or edge 22 with the first surface 14 at a point distal from the input surface 20.

In an embodiment, as shown in FIG. 5, the waveguide 10 extends from the input surface 20 a distance of about 30 mm. In this embodiment, the base 46 of the waveguide 10 is approximately 6 mm and the first portion 32, 34 of each of the first and second surfaces 14, 28 extends away from the input surface 20 approximately 6 mm. The first edge portion $E_1$ forms a radius of approximately 0.25 mm with the end of the first tapered portion $T_1$, and the first and second surfaces 14, 28 form an end surface or edge 22 with a radius of approximately 0.25 mm.

In yet another embodiment, as shown in FIG. 5, the first surface 14 is further comprised of a plurality of tapered portions $T_1, T_2, T_3 \ldots T_n$, each tapered portion having a first end 48 coincident with an end 50 of an edge portion $E_1, E_2, E_3, \ldots E_n$, distal to the axis 26 of the waveguide 10 and a second end 52 adjacent to a second end 54 of an edge portion $E_1, E_2, E_3, \ldots E_n$, proximal to the axis 26. Likewise, the second surface 28 is further comprised of a plurality of tapered portions $T_{1(a)}, T_{2(a)}, T_{3(a)} \ldots T_{n(a)}$ that are opposite the, respective, tapered portions of the first surface 14. In a particular version of this embodiment, the tapered portion $T_n$ of the first surface 14 farthest from the input surface 20 forms an end or edge 22 with the tapered portion $T_{n(a)}$ of the second surface 28 farthest from the input surface 20.

Figure 6:
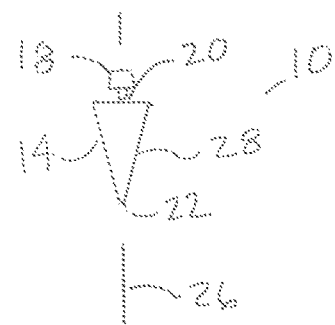
FIG. 6 is a side view of an embodiment of a waveguide.

In still another embodiment of an optical waveguide 10, as shown in FIG. 6, a first surface 14 tapers from an input surface 20 toward a center axis 26 of the waveguide 10, a second surface 28 displaced from and opposite the first surface 14 that tapers toward the center axis 26. In a particular version of this embodiment, the second surface 28 forms an end surface or edge 22 with the first surface 14 distal from the input surface 20.

Figure 7:
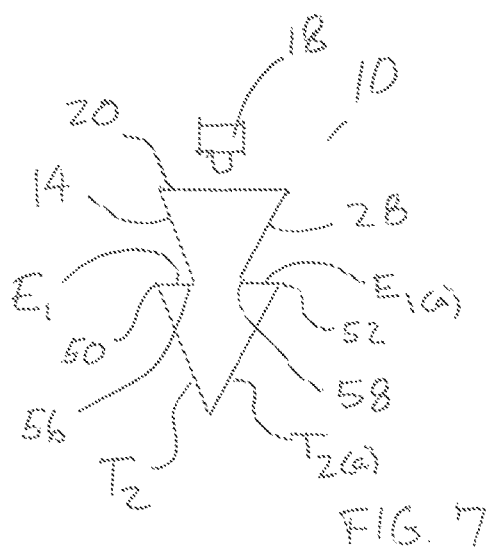
FIG. 7 is a side view of an embodiment of a waveguide.

In another embodiment, an edge portion $E_1$ extends from an end 56 of the first surface 14 distal to the input surface 20, and away from the axis 26 of the waveguide 10, as shown in FIG. 7. A second tapered portion $T_2$ of the first surface 14 extends from an end 50 of the first edge portion $E_1$ distal to the axis 26 and angles toward the axis 26 of the waveguide 10. An edge portion $E_{1(a)}$ extends from an end 58 of the first tapered portion of the second surface 28 distal to the input surface 20, and away from the axis 26 of the waveguide 10, while a second tapered portion $T_{2(a)}$ of the second surface 28 extends from an end 52 of the edge portion $E_{1(a)}$ distal to the axis 26 and angles toward the axis 26 of the waveguide 10. In a particular version of this embodiment, the second tapered portion $T_{2(a)}$ of the second surface 28 form an end surface or edge 22 with the second tapered portion $T_2$ of the first surface 14 distal to the input surface 20.

Also disclosed is a lighting device comprised of an optical waveguide body 10 having a first end 20 and first and second side surfaces 14, 28. The first side surface 14 is comprised of at least one tapered surface $T_1$ extending toward the second side surface 28, and at least one tapered surface $T_{1(a)}$ extending toward the first side surface 14. In an embodiment, the first side surface 14 comprises a plurality of tapered portions $T_1, T_2, T_3 \ldots T_n$ extending toward the second side surface 28. In a particular version of this embodiment, the second side surface 28 comprises a plurality of tapered portions $T_{1(a)}, T_{2(a)}, T_{3(a)} \ldots T_{n(a)}$ extending toward the first side surface 14. In still another particular version of this embodiment, a tapered portion $T_n$ of the first side surface 14 and a tapered portion $T_{n(a)}$ of the second side surface 28 meet at the end 22 of the waveguide body 10.

In another embodiment of the lighting device, an intermediate surface $E_1, E_2, E_3, \ldots E_n$ is positioned between each of the plurality of tapered surfaces $T_1, T_2, T_3 \ldots T_n$ of the waveguide body 10. In one version of this embodiment, the intermediate surface $E_1$ is substantially normal to a central axis 26 of the waveguide 10. The intermediate surface $E_1$ may also be a curved surface or a straight surface. In another embodiment, the intermediate surface $E_1$ may be a straight surface tapered in the opposite direction of the each of the plurality of tapered surfaces $T_1, T_2, T_3 \ldots T_n$. In still another version, the tapered surface $T_1$ forms an acute angle with the first surface 14. In yet another embodiment, the tapered surface $T_1$ of the first surface 14 forms an edge 22 with the second surface 28.

In still another embodiment of the lighting device, the waveguide body 10 includes a plurality of tapered surfaces $T_1, T_2, T_3 \ldots T_n$ that form an acute angle with the first surface 14. In yet another embodiment, the first surface 14 is comprised of a plurality of straight surfaces 14. Each one of the plurality of straight surfaces 14 is separated by a tapered surface $T_1, T_2, T_3 \ldots T_n$, and each one of the tapered surfaces $T_1, T_2, T_3 \ldots T_n$ form an acute angle with respect to each of their, respective, straight surfaces 14.

FIG. 8, shows still another embodiment of the lighting device having a waveguide 10 where the first and second surfaces 14, 28 are each further comprised of a plurality of tapered surfaces $T_1, T_{1(a)}, T_2, T_{2(a)} \ldots T_n T_{n(a)}$, each tapered surface having a first end 58 extending from an end of a proceeding tapered surface, wherein the odd numbered surfaces in a sequence extend toward the center axis 26 and the even numbered surfaces in the sequence extend away from the center axis 26, and the tapered portion of the first surface 14 farthest from the input surface 18 forms an end surface or edge 22 with the tapered portion of the second surface 28 farthest from the input surface 20.

Figure 9:
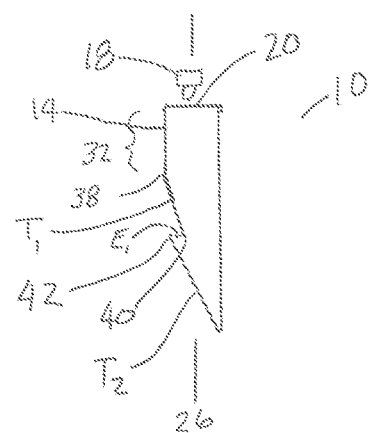
FIG. 9 is a side view of an embodiment of a waveguide.

In yet another embodiment, as shown in FIG. 9, the first surface 14 has a first portion 32 proximal to the input surface 20. The first portion 32 extends away from the input surface 20 parallel to the axis 26 of the waveguide 10. A first tapered portion $T_1$ of the first surface 14 extends from an end 38 of the first portion 32 of the first surface 14 distal to the input surface 20, toward the axis 26 of the waveguide 10. A first edge portion $E_1$ extends from an end 40 of the first tapered portion $T_1$ distal to the input surface 20, and away from the axis 26 of the waveguide 10. A second tapered portion $T_2$ of the first surface 14 extends from an end 42 of the first edge portion $E_1$ distal to the axis 26 and angles toward the axis 26 of the waveguide 10. A second surface 28 is displaced from the first surface 14 and parallel to the center axis 26. In a particular version of this embodiment, the second tapered portion $T_2$ of the first surface 14 forms an ends surface or edge 22 with the second surface 28.

Figure 10:
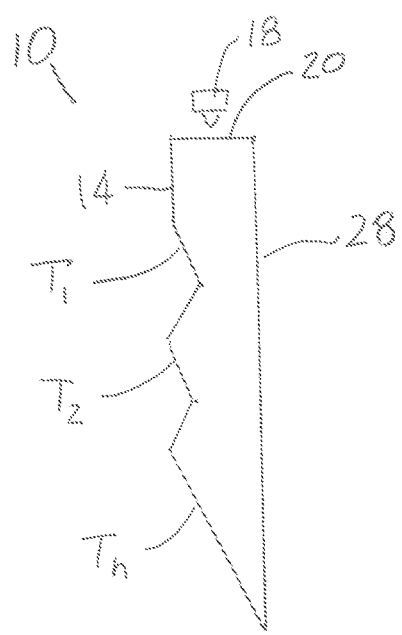
FIG. 10 is a side view of an embodiment of a waveguide.

In still another embodiment, as shown in FIG. 10, the first surface 14 is further comprised of a plurality of tapered surfaces $T_1, T_2, \ldots T_n$, each tapered surface having a first end 48 coincident with an end 50 of a first edge portion $E_1$ distal to the axis 26 and a second end 52 coincident with a second end 54 of an edge portion $E_2$ proximal to the axis 26 where the tapered portion $T_n$ of the first surface 14 farthest from the input surface 20 forms an end surface or edge 22 with the second surface 28.

Figure 7A:
FIG. 7A is a side view of an embodiment of a waveguide.

In an embodiment, as shown in FIG. 7A, a light transmissive waveguide body 10 includes a first part 13 having an input section 15, an output section 17 and a tapered portion $T_1$ between the input section 15 and the output section 17. A second part 19 of the waveguide body 10 will have an input section 21, an output section 23, and a tapered portion $T_2$ between the input section 21 and output section 23, wherein the input section 21 of the second part 19 is coincident with the output section 17 of the first part 13, and a light source 18 is proximal to the input section 15 of the first part 13.

Figure 11:
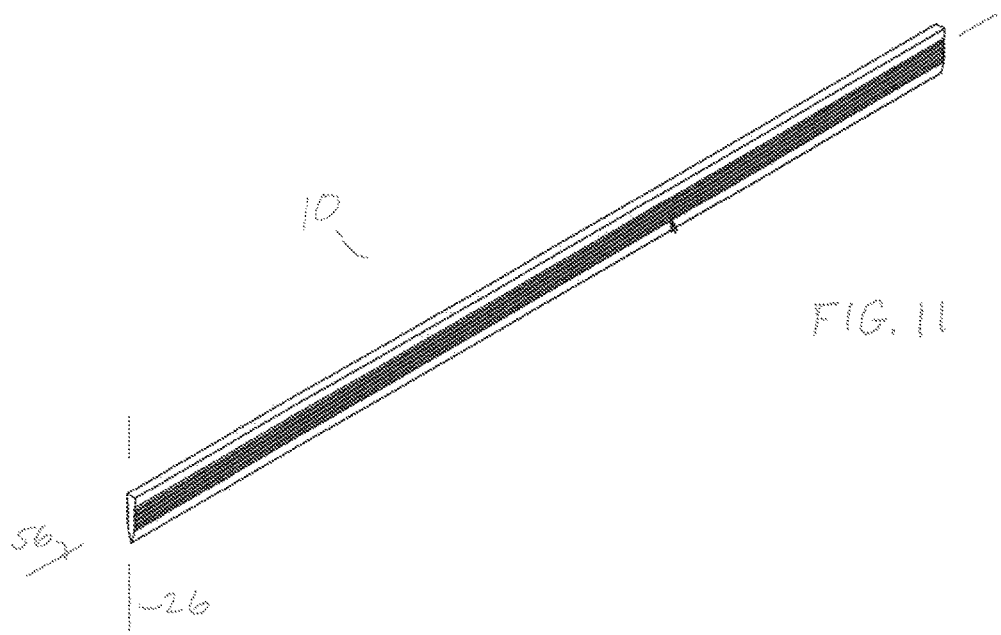
FIG. 11 is an isometric view of an embodiment of a waveguide.
Figure 12:
FIG. 12 is a front view of an embodiment of a waveguide.

In each embodiment, a light source 18 is located external to and adjacent the input surface 20. In a particular embodiment, the light source is a light emitting diode (LED). As shown in FIGS. 11 and 12, the waveguide body 10 may be an elongated structure with a longitudinal axis 56 perpendicular to the axis 26 of the waveguide 10.

Figure 14:
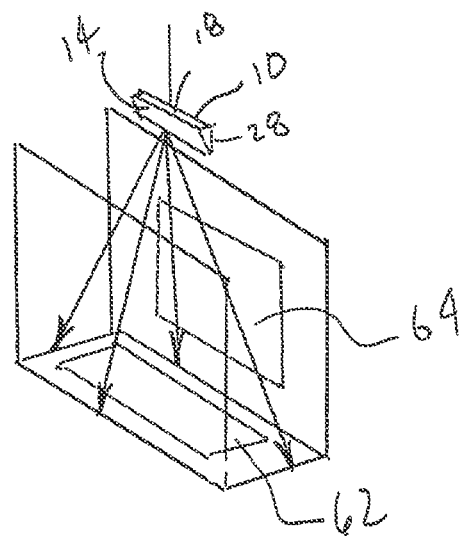
FIG. 14 is an isometric view of an embodiment of a waveguide lighting a corridor and sidewall.
Figure 15:
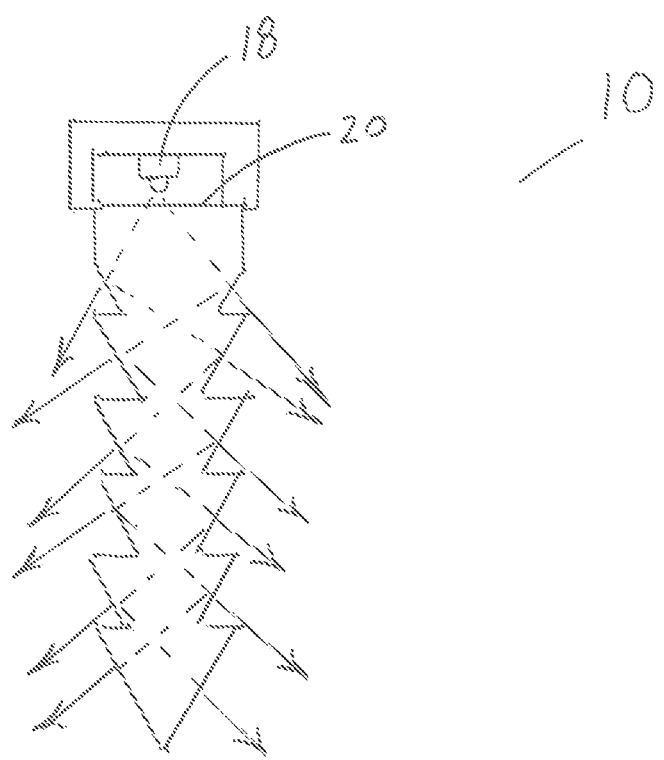
FIG. 15 is a side view of an embodiment of a waveguide showing how the light paths are extracted through the waveguide.

As shown in FIGS. 13 and 14, the waveguide 10 is typically positioned such that the coupling chamber 16 and the input surface 18 are above the surface 62 or area 64 to be lighted and the surfaces 14, 28 of the waveguide 10 extend downward from the input surface 18 toward a surface 62 to be lighted. When in operation, the light source 18 is powered in any conventional manner known in the art. Light from the light source 18 is then emitted through the tapered surfaces $T_1 \ldots T_n$. As shown in FIG. 15, light is emitted from a light source 18 at the input surface 20 and reflected internally along the tapered portions of the first and second surfaces 14, 28 as the light travels through the waveguide body 10. If the angle of incidence of a light ray at the surface of a tapered portion $T_1 \ldots T_n$ exceeds the critical angle, the light ray will pass through the surface and out of the waveguide 10. Light rays 27 that do not exceed the critical angle will reflect off the surface of the tapered portions $T_1 \ldots T_n$ and toward a tapered portion $T_{1(a)} \ldots T_{n(a)}$ opposite and downstream of the surface off of which the ray 27 reflected. Any remaining light may exit the waveguide 10 at the edge of the waveguide 22 opposite the input surface 20.

In an embodiment, the edge portions $E_1$, $E_2$, $E_3$, etc. of the waveguide may be coated with a reflective material, such as a white or silvered material to reflect any remaining light back into the waveguide body 10, if desired.

The angle of the tapered portions of the first and second surfaces 14, 28 of the waveguide body 10 allows light to escape, while the substantially normal edge portions of the waveguide body 10 prevents the escape of light through total internal reflection. Specifically, total internal reflection refers to the internal reflection of light within the waveguide body that occurs when the angle of incidence of the light ray at the surface is less than a threshold referred to as the critical angle. The critical angle depends on the indices of refraction (N) of the material of which the waveguide body is composed and of the material adjacent to the waveguide body. For example, if the waveguide body is an acrylic material having an index of refraction of approximately 1.5 and is surrounded by air, the critical angle, $\theta_c$, is as follows:

$$\theta_c = \arcsin(N_{acrylic}/N_{air}) = \arcsin(1.5/1) = 41.8°$$

Although waveguides can have rough or textured surfaces, in a preferred embodiment, all surfaces of the waveguides must be polished smooth.

Figure 16:
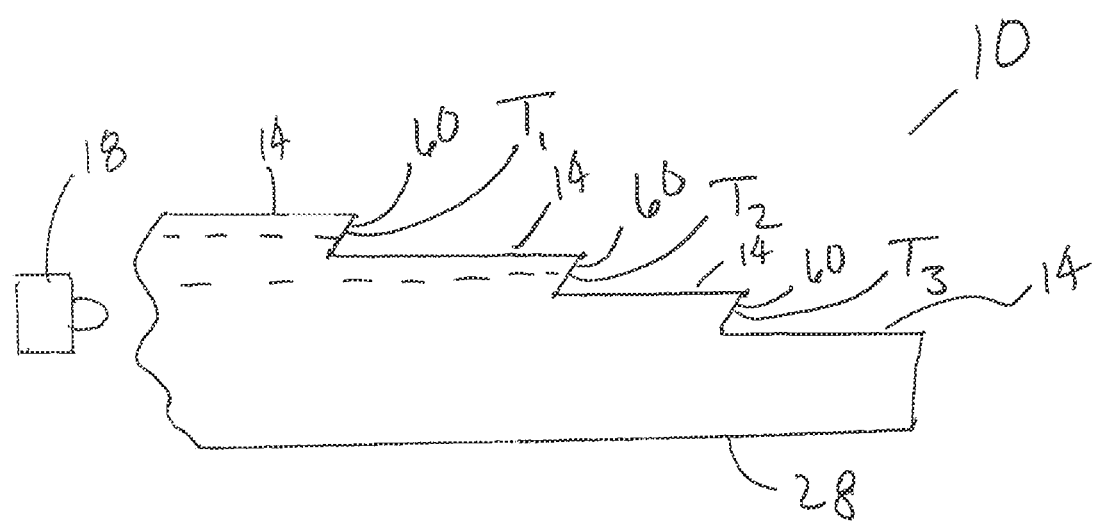
FIG. 16 is an embodiment of a waveguide.

FIG. 16 illustrates an embodiment wherein extraction features or tapered portions $T_1$, $T_2$, $T_3$, . . . $T_n$ include surfaces 60 that form an acute angle with respect to the first surface 14. In this embodiment, the light rays traveling from left to right as seen in FIG. 16 are extracted out of the surface including the surfaces 14, 60 as seen in FIG. 16.

Figure 17:
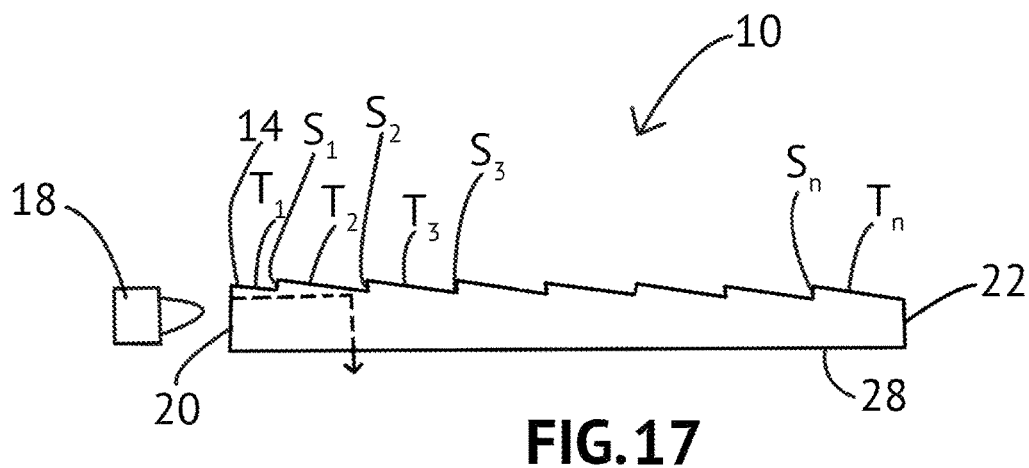
FIG. 17 is an enlarged fragmentary view of a portion of the waveguide embodiment of FIG. 19.
Figure 18:
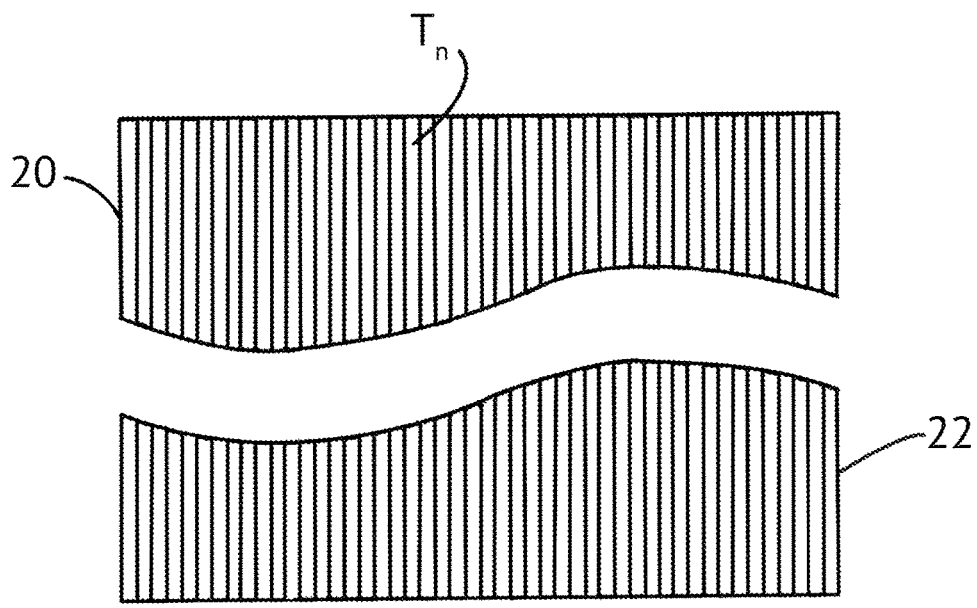
FIG. 18 is a plan view of a waveguide embodiment.
Figure 19:
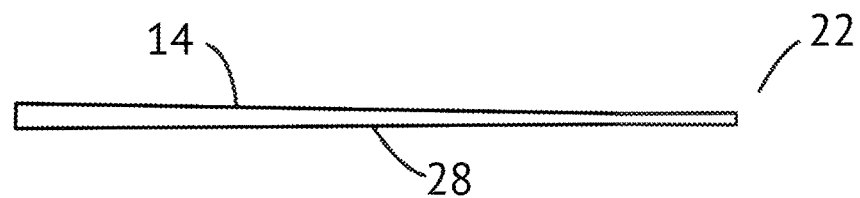
FIG. 19 is a side view of a waveguide embodiment.

Yet another modification of the embodiment of FIG. 16 is seen in FIGS. 17-19 wherein the first surface 14 of tapered waveguide body 10 includes tapered portions $T_1$, $T_2$, $T_3$, . . . $T_n$. The surfaces 14 of tapered portions $T_1$, $T_2$, $T_3$, . . . $T_n$ are separated from one another by intermediate step surfaces $S_1$, $S_2$, $S_3$, . . . $S_n$. The waveguide body 10 tapers from a first thickness at the input surface 20 to a second, lesser thickness at the end surface 22. Light is directed out of the second surface 28.

Extraction features such as tapered surfaces may also be used to internally reflect and prevent the uncontrolled escape of light. For example, as seen in FIG. 15, a portion of light that contacts a surface 81 of a typical extraction feature 76 escapes uncontrolled.

Also disclosed is a lighting system comprised of a first optical waveguide body 10 that intersects with a second optical waveguide body 11 at substantially a mid-point 13 of a longitudinal axis 25 of the second optical waveguide body 11. In the system, the first optical waveguide body 10 has a first surface 14 that extends between an input surface 18 and an end surface 22. The first surface 18 has at least two tapered portions $T_1$ and $T_2$ that extend inward from an outer portion of the first surface 14, and an intermediate surface 39 located between each of the at least two tapered portions $T_1$ and $T_2$. The second optical waveguide body 11 also has a first surface 14 that extends between an input surface 18 and an end surface 22. The first surface 14 of the second optical waveguide body 11 also includes at least two tapered portions $T_1$ and $T_2$ that extend inward from an outer portion of the first surface 14, and an intermediate surface 39 between each of the at least two tapered portions $T_1$ and $T_2$.

When in operation, as shown in FIG. 13 light sources 18 which are located external and adjacent to the input surface 20 of each of the first and second optical waveguide bodies 10, 11, respectively, are powered using any conventional manner known in the art. Light from the light sources 18 is then emitted through the tapered surfaces $T_1 \ldots T_n$ so as to light a given surface or area 62.

Other embodiments of the disclosure including all of the possible different and various combinations of the individual features of each of the foregoing embodiments and examples are specifically included herein.

INDUSTRIAL APPLICABILITY

The waveguide components described herein may be used singly or in combination. Specifically, a flat, curved, or otherwise-shaped waveguide body with or without discrete extraction features could be combined with any of the coupling optics and light sources described herein. In any case, one may obtain a desired light output distribution.

Numerous modifications to the present disclosure will be apparent to those skilled in the art in view of the foregoing description. Accordingly, this description is to be construed as illustrative only and is presented for the purposes of enabling those skilled in the art to make and use the present disclosure and to teach the best mode of carrying out the same.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An optical waveguide, comprising:
   a first optical waveguide body comprising a first end extending along a length dimension of the first optical waveguide body comprising a first thickness adapted to receive light;
   a plurality of LEDs disposed adjacent the first end along the length dimension thereof;
   a second end extending along the length dimension of the optical waveguide opposite the first end comprising a second thickness less than the first thickness;
   wherein an extent of the length dimension extending along the first end is greater than an extent of a dimension extending between the first end and the second end;
   wherein a second optical waveguide body intersects with the first optical waveguide body to define a first portion of the first optical waveguide body and a second portion of the first optical waveguide body;
   the first portion of the first optical waveguide body comprising:
      a series of first cascading surfaces spaced from one another and extending from the first end to the second end, wherein the series of first cascading surfaces are substantially parallel to a central axis of the first optical waveguide body;
      a series of second surfaces each disposed between each adjacent pair of first cascading surfaces of the series of first cascading surfaces and connecting with each adjacent pair of first cascading surfaces at two vertices forming acute angles with respect to such adjacent pair of first cascading surfaces, wherein the series of first cascading surfaces and the series of second surfaces extend longitudinally along the length dimension of the first portion of the first optical waveguide body, wherein the received light is extracted out of the series of first cascading surfaces and the series of second surfaces; and
      a third surface opposite the series of first cascading surfaces and the series of second surfaces and disposed between the first end and the second end, wherein the third surface is planar;
   the second portion of the first optical waveguide body comprising:
      a series of fourth cascading surfaces spaced from one another and extending from the first end to the second end, wherein the series of fourth cascading surfaces are substantially parallel to a central axis of the first optical waveguide body;
      a series of fifth surfaces each disposed between each adjacent pair of fourth cascading surfaces of the series of fourth cascading surfaces and connecting with each adjacent pair of fourth cascading surfaces at two vertices forming acute angles with respect to such adjacent pair of fourth cascading surfaces, wherein the series of fourth cascading surfaces and the series of fifth surfaces extend longitudinally along the length dimension of the second portion of the first optical waveguide body, wherein the received light is extracted out of the series of fourth cascading surfaces and the series of fifth surfaces; and
      a sixth surface opposite the series of fourth cascading surfaces and the series of fifth surfaces and disposed between the first end and the second end, wherein the sixth surface is planar; and
   wherein the first and second optical waveguide bodies are disposed within a suspended lighting device.

2. The optical waveguide of claim 1, wherein each of the series of first cascading surfaces are substantially parallel.

3. The optical waveguide of claim 1, wherein each of the series of second surfaces are substantially parallel.

4. An optical waveguide, comprising:
   a first optical waveguide body comprising a first end extending along a length dimension of the optical waveguide comprising a first thickness adapted to receive light;
   a plurality of LEDs disposed along the length dimension and emitting light into the first end;
   a second end extending along the length dimension of the optical waveguide opposite the first end comprising a second thickness less than the first thickness;
   wherein the length dimension of the first end is greater than another length dimension extending between the first end and the second end;
   wherein at least one second optical waveguide body intersects with the first optical waveguide body to define a first portion of the first optical waveguide body and a second portion of the first optical waveguide body;
   the first portion of the first optical waveguide body comprising:
      a series of first cascading surfaces spaced from one another disposed between the first end and the second end;
      a series of second surfaces each disposed between each adjacent pair of cascading surfaces of the series of first cascading surfaces and connecting each adjacent pair of cascading surfaces of the series of first cascading surfaces together, and disposed at an angle with respect to each adjacent pair of cascading surfaces of the series of first cascading surfaces, wherein each of the series of first cascading surfaces is planar throughout a full extent thereof, wherein the series of first cascading surfaces and the series of second surfaces extend longitudinally along the length dimension of the first portion of the first optical waveguide body; and
      a third surface opposite the series of first cascading surfaces and the series of second surfaces and disposed between the first end and the second end, wherein each of the series of first cascading surfaces tapers toward the third surface with distance from the first end;
   the second portion of the first optical waveguide body comprising:
      a series of fourth cascading surfaces spaced from one another disposed between the first end and the second end;

a series of fifth surfaces each disposed between each adjacent pair of cascading surfaces of the series of fourth cascading surfaces and connecting each adjacent pair of cascading surfaces of the series of fourth cascading surfaces together, and disposed at an angle with respect to each adjacent pair of cascading surfaces of the series of fourth cascading surfaces, wherein each of the series of fourth cascading surfaces is planar throughout a full extent thereof, wherein the series of fourth cascading surfaces and the series of fifth surfaces extend longitudinally along the length dimension of the second portion of the first optical waveguide body; and a sixth surface opposite the series of fourth cascading surfaces and the series of fifth surfaces and disposed between the first end and the second end, wherein each of the series of fourth cascading surfaces tapers toward the sixth surface with distance from the first end; and wherein the optical waveguide is mounted within a suspended lighting device.

5. The optical waveguide of claim 4, wherein each of the series of first cascading surfaces are substantially parallel.

6. The optical waveguide of claim 4, wherein each of the series of second surfaces are substantially parallel.

7. The optical waveguide of claim 4, wherein the third surface and the sixth surface are planar.

8. The optical waveguide of claim 4, wherein each of the series of second surfaces is substantially normal to a central axis of the waveguide.

9. The optical waveguide of claim 4, wherein the light is directed outwardly from the third surface and the sixth surface.

* * * * *